United States Patent
Kern

(10) Patent No.: US 6,477,069 B1
(45) Date of Patent: Nov. 5, 2002

(54) CIRCUIT FOR DETECTING AND INADMISSIBLY HIGH CURRENT IN AN OUTPUT STAGE

(75) Inventor: Robert Kern, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,039

(22) PCT Filed: Jun. 16, 2000

(86) PCT No.: PCT/DE00/01905

§ 371 (c)(1),
(2), (4) Date: Apr. 12, 2001

(87) PCT Pub. No.: WO00/77905

PCT Pub. Date: Dec. 21, 2000

(30) Foreign Application Priority Data

Jun. 16, 1999 (DE) .......................................... 199 27 389

(51) Int. Cl.[7] ............................................. H02M 7/219
(52) U.S. Cl. .......................... 363/98; 363/132; 323/284
(58) Field of Search .............................. 363/17, 97, 98, 363/131, 132; 323/282, 284, 285

(56) References Cited

U.S. PATENT DOCUMENTS

| 4,879,641 A | | 11/1989 | Cuomo et al. ............... 318/432 |
| 5,043,650 A | * | 8/1991 | Bhagwat et al. ........ 363/132 X |
| 5,204,809 A | * | 4/1993 | Andresen ..................... 363/132 |
| 5,708,578 A | * | 1/1998 | Stoddard et al. .............. 363/98 |

FOREIGN PATENT DOCUMENTS

| DE | 43 29 919 | 3/1995 |
| DE | 197 04 166 | 8/1997 |
| EP | 0 193 447 | 9/1986 |

* cited by examiner

*Primary Examiner*—Jessica Han
(74) *Attorney, Agent, or Firm*—Kenyon & Kenyon

(57) ABSTRACT

A circuit for detecting an impermissibly high current in an output stage contains two transistors arranged in a bridge branch of a bridge circuit. A comparator compares the voltage obtained at the connection point of the two transistors with the voltage obtained at the center tap of a voltage divider connected to the power supply terminals. A switching transistor changes the voltage divider ratio of the voltage divider as a function of the switching signal of one of the transistors.

4 Claims, 1 Drawing Sheet

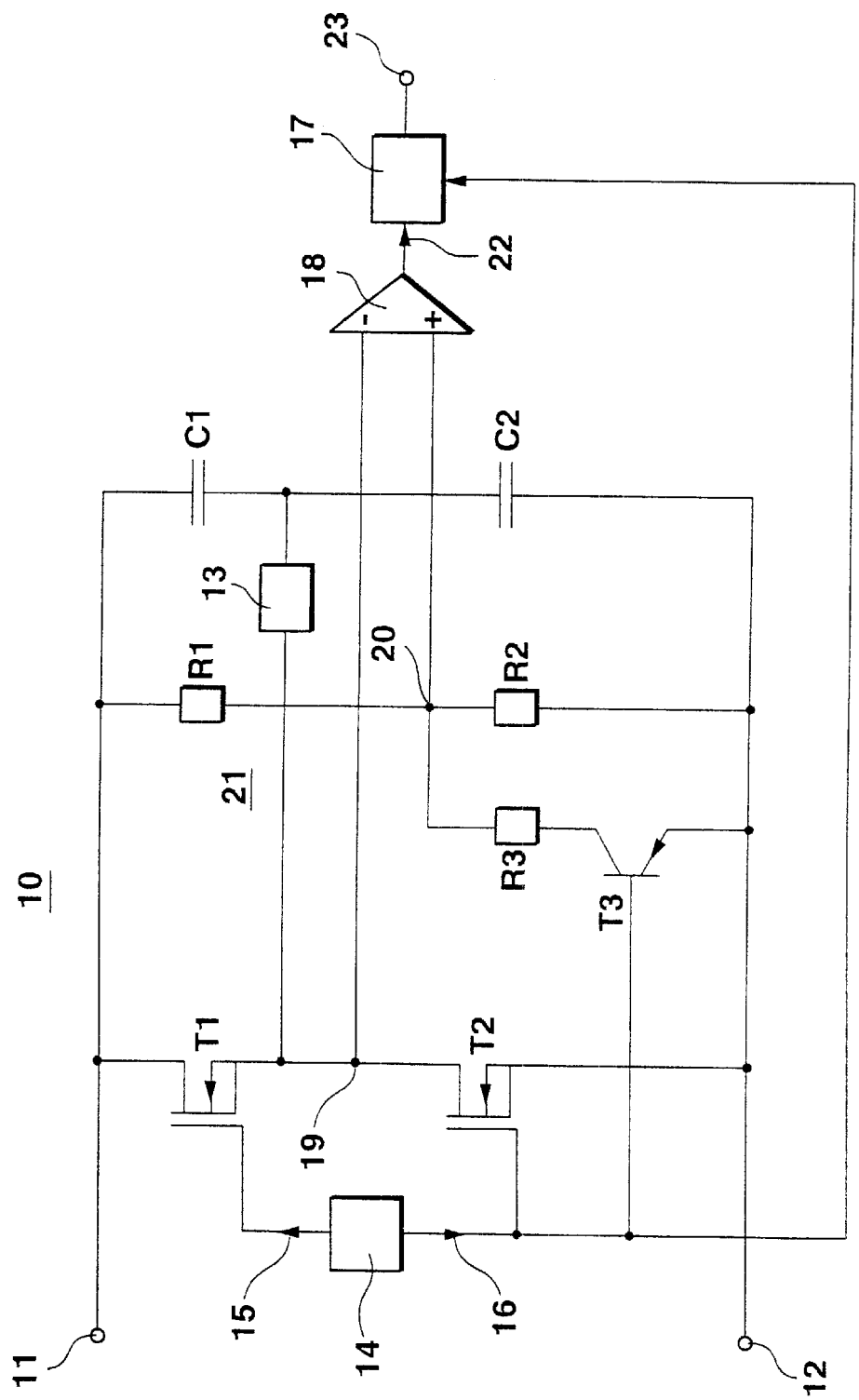

CIRCUIT FOR DETECTING AND INADMISSIBLY HIGH CURRENT IN AN OUTPUT STAGE

BACKGROUND INFORMATION

German Patent Application No. 43 29 919 describes an output stage for operating a load arranged in a motor vehicle, which contains two series circuits of a first transistor with a second transistor, connected between a first and a second power supply terminal. The four output stage transistors form a bridge circuit, in whose diagonals the electrical load is arranged. The current flowing through each of the four output stage transistors is detected by a current sensor for each and compared with a predefined maximum value in a comparator. If a threshold is exceeded, the respective output stage transistor is turned off. Using inexpensive current sensors, which do not allow electrical isolation, the conventional circuit needs four comparators, each at a different potential.

SUMMARY OF THE INVENTION

An object of the present invention is to provide a circuit for detecting an impermissibly high current in an output stage, using the least possible number of simple electronic components.

The present invention provides a series circuit of a first transistor with a second transistor, connected between a first and a second power supply terminal, an input of a comparator being connected at the connection point of the two transistors. The other input of the comparator is connected at the center tap of a voltage divider connected between the two power supply lines. Change-over switching means, which are controlled by the switching signal of one of the two transistors, for changing the voltage divider ratio are provided.

The circuit according to the present invention detects the voltage drop across the gap of the transistors when the gap is closed. The two transistors are arranged, for example, in a half-bridge or full-bridge circuit. The two transistors are alternately switched on or off. An input signal of one transistor can therefore be used to actuate the change-over switching means which change the voltage divider ratio. The switching threshold of the comparator can be adapted by this change either to the first transistor or to the second transistor. In normal operation, the output signal of the comparator changes to a different state when the input signal of one of the two transistors changes. Based on this output signal of the comparator, a change in the other signal state also takes place in the event of an overcurrent; this change is detected in an additional circuit (not illustrated) and can be used, for example, to turn off one transistor or all transistors.

The essential advantage of the circuit according to the present invention is that no additional current sensor and only one comparator is needed for the two transistors. The electronic components used are relatively simple and therefore inexpensive.

The circuit according to the present invention is well-suited in particular for use in a half-bridge circuit in which the other bridge branch is formed by two capacitors. In particular, the circuit according to the present invention is well-suited for use in a full-bridge circuit in which the capacitors of the half-bridge circuit are replaced by output stage transistors. The circuit according to the present invention can also be used in this additional bridge branch, so that a total of two comparators and two change-over switching means are required for a full-bridge circuit.

The output signal of the comparator which in normal operation changes as a function of the input signals is advantageously sent to a logic selector circuit, which is responsible for a signal change at the output of the logic selector circuit as a function of the input signal of one of the two transistors only if an impermissibly high current is detected in one of the two transistors. A particularly simple implementation of the logic selector circuit is possible through an exclusive-or (EXOR) arrangement.

Another advantageous embodiment concerns the change-over switching means, which preferably contain a switching transistor, which connects a shunt resistor to a resistor of the voltage divider.

BRIEF DESCRIPTION OF THE DRAWINGS

The FIGURE shows an embodiment of a circuit according to the present invention for detecting an impermissibly high current in an output stage.

DETAILED DESCRIPTION

The Figure shows an output stage 10, which is designed as a half-bridge circuit, for example. A series circuit of a first transistor T1 with a second transistor T2 is connected between a first and a second power supply terminal 11, 12. Transistors T1, T2 form a first bridge branch of the half-bridge circuit of output stage 10. The second bridge branch contains first and second capacitors C1, C2. Load 13 to be supplied with electrical power is in the bridge diagonals.

A control circuit 14 sends a first switching signal 15 to transistor T1 and a second switching signal 16 to transistor T2. Second switching signal 16 is also sent to a switching transistor T3 and a logic selector circuit 17.

A comparator 18 compares the voltage obtained at connection point 19 of the two transistors T1, T2 with the voltage at center tap 20 of voltage divider 21 connected between the two power supply terminals 11, 12. Voltage divider 21 contains resistors R1 and R2, resistor R2 going from center tap 20 to second power supply terminal 12. Switching transistor T3, which is generally referred to as change-over switching means, can connect a shunt resistor R3 in parallel to resistor R2.

Comparator 18 sends an output signal 22 to logic selector circuit 17, which delivers an overcurrent signal 23 at its output.

The circuit according to the present invention for detecting an impermissibly high current in output stage 10 operates as follows:

An overcurrent in one of transistors T1, T2 is detected by monitoring the voltage drop across the gap of transistors T1, T2. Transistors T1, T2 may also be other semiconductor components in which the voltage drop across the gap in the conductive state is a measure for the current flowing through the semiconductor component.

The voltage drop is monitored by comparator 18. The comparison voltage is obtained at center tap 20 of voltage divider 21. Only one of the two transistors T1, T2 is on at any time. Therefore, control circuit 14 only sends first control signal 15 for turning on transistor T1 or second control signal 16 for turning on transistor T2. When subsequently transistor T1 is on, transistor T2 and the change-over switching means, implemented, for example, as switching transistor T3, remain off. Shunt resistor R3 has no effect in this operating state, so that the comparison voltage at center tap 20 is only determined by resistors R1, R2. Resistors R1, R2 should be dimensioned so that a voltage corresponding to the maximum current flowing through transistor T1 in normal operation appears at center tap 20. An overcurrent occurring in the transistor causes a voltage drop across the gap of transistor T1, such that the voltage becomes less than the comparison voltage. Thus, in the event of an overcurrent in transistor T1, a low-level output signal 22 occurs in the circuit logic of comparator 18 shown in the Figure, in which output signal 22 of comparator 18 goes to a logical low level when the voltage at connecting point 19 has a lower potential than at center tap 20.

Logic selector circuit 17, which may be provided, preferably implemented as an exclusive-or arrangement (EXOR), also sends a low-level signal as an overcurrent signal 23, because second switching signal 16, which is also low level and causes transistors T2, T3 to be turned off, is sent to exclusive-or arrangement 17.

If normal current flows in transistor T1, the voltage drop across transistor T1 is insufficient to switch comparator 18. Output signal 22 of the comparator, which also appears at the output of logic selector circuit 17, is at a logical high level in this operating state. A high level as an overcurrent signal 23 means that no overcurrent is present.

After control circuit 14 switches over, i.e., when no first control signal 15 is present and instead second control signal 16 appears for turning on transistor T2 and transistor T3, comparator 18 monitors the voltage drop across transistor T2. Switching transistor T3 engages into voltage divider 21 due to the parallel connection of resistor R3 with resistor R2. Resistor R3 should be dimensioned so that the comparison voltage appearing at center tap 20 of voltage divider 21 corresponds to the maximum permissible voltage drop across transistor T2. In the event of a permissible current through transistor T2, this voltage drop is less than the comparison voltage, so that comparator 18 issues a low-level output signal. Logic selector circuit 17 issues a high level output signal, because second switching signal 16 now has a high level. If the current flowing through transistor T2 exceeds the predefined value, output signal 22 of comparator 18 jumps to a high level, which, if there is simultaneously a second high-level switching signal 16, results in a logical low-level overcurrent signal 23.

Overcurrent signal 23 at the output of logic selector circuit 17 can be used for turning off output stage 10 fully or at least partially. In particular, the transistor in which the overcurrent occurred can be individually turned off using control circuit 14.

Logic selector circuit 17 is responsible for overcurrent signal 23 always having the same logical level in the event of an overcurrent. Because the two switching signals 15, 16 are always known, logic selector circuit 17 is not required.

The signal change in output signal 22 of comparator 18 in normal operation without overcurrent occurring when the switching level of the two switching signals 15, 16 changes can be contained in the switch-off arrangement (not described in detail) for the entire output stage 10 or for the individual transistor T1, T2 in question.

The half-bridge circuit shown in the Figure can be supplemented by doubling the components according to the present invention to form a full-bridge circuit. Instead of the two capacitors C1, C2, additional transistors are provided. In addition, another switch-selectable voltage divider 21 and another comparator 18 are needed.

The circuit according to the present invention can be used, in particular, for high-frequency output stages 10. If the clock frequency is reduced, component costs can be further reduced by using a microprocessor having integrated A/D converters and a digital signal processing unit.

What is claimed is:

1. A circuit for detecting an impermissibly high current in an output stage, comprising:

a series circuit of a first semiconductor component and a second semiconductor component, the series circuit being coupled between first and second power supply terminals;

a voltage divider coupled between the first and second power supply terminals, the voltage divider having a center tap;

a comparator for comparing a voltage drop across one of the first and second semiconductor components with a predefined threshold value, the comparator having a first input and a second input, the first input being coupled to a connection point of the first and second semiconductor components, the second input being coupled to the center tap of the voltage divider; and a change-over switching element for changing a ratio of the voltage divider, the change-over switching element being controlled by a switching signal of one of the first and second semiconductor components.

2. The circuit according to claim 1, further comprising a logic selector circuit receiving an output signal of the comparator and the switching signal.

3. The circuit according to claim 2, wherein the logic selector circuit includes an exclusive-or arrangement.

4. The circuit according to claim 1, wherein the change-over switching element includes a switching transistor, the switching transistor connecting a shunt resistor in parallel to a resistor of the voltage divider.

* * * * *

UNITED STATES PATENT AND TRADEMARK OFFICE
CERTIFICATE OF CORRECTION

PATENT NO.    : 6,477,069 B1
DATED         : November 5, 2002
INVENTOR(S)   : Robert Kern It is certified that error appears in the above-identified patent and that said Letters Patent is hereby corrected as shown below:

<u>Title page, Item [54] and Column 1, line 1</u>,
Title, change "AND" to -- AN --.

<u>Column 2</u>,
Line 17, change "FIGURE" to -- Figure --.

Signed and Sealed this

Twelfth Day of October, 2004

JON W. DUDAS
*Director of the United States Patent and Trademark Office*